(12) United States Patent
Govande et al.

(10) Patent No.: US 10,846,766 B2
(45) Date of Patent: Nov. 24, 2020

(54) CONTEXTUAL MENUS BASED ON IMAGE RECOGNITION

(75) Inventors: Shailesh Dinkar Govande, Round Rock, TX (US); Madhura P. Tipnis, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/537,482

(22) Filed: Jun. 29, 2012

(65) Prior Publication Data
US 2014/0007012 A1 Jan. 2, 2014

(51) Int. Cl.
G06F 3/0482 (2013.01)
G06F 16/583 (2019.01)
G06Q 30/06 (2012.01)
G06Q 30/02 (2012.01)

(52) U.S. Cl.
CPC ........... *G06Q 30/06* (2013.01); *G06F 3/0482* (2013.01); *G06F 16/583* (2019.01); *G06Q 30/02* (2013.01)

(58) Field of Classification Search
CPC . G06F 17/30047; G06F 3/0482; G06Q 30/06; G06Q 30/02
USPC ................... 715/811, 817; 707/710; 348/307
See application file for complete search history.

(56) References Cited

U.S. PATENT DOCUMENTS

| | | |
|---|---|---|
| 5,546,475 A | 8/1996 | Bolle et al. |
| 5,579,471 A | 11/1996 | Barber et al. |
| 5,781,899 A | 7/1998 | Hirata |
| 5,870,149 A | 2/1999 | Comroe et al. |
| 5,889,896 A | 3/1999 | Meshinsky et al. |
| 6,134,548 A | 10/2000 | Gottsman |
| 6,154,738 A | 11/2000 | Call |
| 6,157,435 A | 12/2000 | Slater et al. |
| 6,216,227 B1 | 4/2001 | Goldstein et al. |
| 6,278,446 B1 | 8/2001 | Liou et al. |
| 6,434,530 B1 | 8/2002 | Sloane et al. |
| 6,477,269 B1 | 11/2002 | Brechner |
| 6,483,570 B1 | 11/2002 | Slater et al. |
| 6,484,130 B2 | 11/2002 | Dwyer et al. |
| 6,512,919 B2 | 1/2003 | Ogasawara |
| 6,530,521 B1 | 3/2003 | Henry |
| 6,549,913 B1 | 4/2003 | Murakawa |
| 6,563,959 B1 | 5/2003 | Troyanker |
| 6,587,835 B1 | 7/2003 | Treyz et al. |

(Continued)

OTHER PUBLICATIONS

Mello, John P., "Pongr Giving Cell Phone Users Way to Make Money," Published: Sep. 18, 2011, available at http://www.techhive.com/article/240209/pongr_giving_cell_phone_users_way_to_make_money.html.*

(Continued)

*Primary Examiner* — Beau D Spratt
(74) *Attorney, Agent, or Firm* — Mintz Levin Cohn Ferris Glovsky and Popeo, P.C.

(57) ABSTRACT

Contextual menus based on images submitted to a network based publication system are disclosed. Images depicting a variety of locales such as businesses, or other items, may be stored in an image repository in the system and used to identify images that users may submit as photograph images taken by cell phone, camera, webcam, a laptop with camera capability. After identification of the submitted image the system may categorize the image and provide the user a category driven menu relating to the photograph, the menu based on both the submitted image and the user's intent when he or she is capturing the image.

20 Claims, 9 Drawing Sheets

(56) References Cited

U.S. PATENT DOCUMENTS

| | | | |
|---|---|---|---|
| 6,589,290 B1 | 7/2003 | Maxwell et al. | |
| 6,763,148 B1 | 7/2004 | Sternberg et al. | |
| 6,947,571 B1 | 9/2005 | Rhoads et al. | |
| 7,130,466 B2 | 10/2006 | Seeber | |
| 7,281,018 B1 | 10/2007 | Begun et al. | |
| 7,363,252 B2 | 4/2008 | Fujimoto | |
| 7,460,735 B1 | 12/2008 | Rowley et al. | |
| 7,478,143 B1* | 1/2009 | Friedman et al. | 709/219 |
| 7,593,602 B2 | 9/2009 | Stentiford | |
| 7,702,185 B2 | 4/2010 | Keating et al. | |
| 7,801,893 B2 | 9/2010 | Gulli et al. | |
| 7,890,386 B1 | 2/2011 | Reber | |
| 7,921,040 B2 | 4/2011 | Reber | |
| 7,933,811 B2 | 4/2011 | Reber | |
| 7,957,510 B2* | 6/2011 | Denney et al. | 379/88.12 |
| 8,130,242 B2 | 3/2012 | Cohen | |
| 8,239,130 B1* | 8/2012 | Upstill | G01C 21/3679 701/400 |
| 8,370,062 B1* | 2/2013 | Starenky et al. | 701/467 |
| 9,251,395 B1* | 2/2016 | Botchen | G06F 17/30247 |
| 9,495,386 B2 | 11/2016 | Tapley et al. | |
| 2001/0049636 A1 | 12/2001 | Hudda et al. | |
| 2002/0107737 A1 | 8/2002 | Kaneko et al. | |
| 2003/0130910 A1* | 7/2003 | Pickover et al. | 705/27 |
| 2003/0208409 A1 | 11/2003 | Mault | |
| 2004/0019643 A1 | 1/2004 | Zirnstein, Jr. | |
| 2004/0057627 A1 | 3/2004 | Abe et al. | |
| 2004/0128320 A1 | 7/2004 | Grove et al. | |
| 2004/0205286 A1 | 10/2004 | Bryant et al. | |
| 2005/0010486 A1 | 1/2005 | Pandhe | |
| 2005/0162523 A1 | 7/2005 | Darrell et al. | |
| 2005/0283379 A1 | 12/2005 | Reber | |
| 2006/0015492 A1 | 1/2006 | Keating et al. | |
| 2006/0059434 A1* | 3/2006 | Boss | G06F 17/243 715/780 |
| 2006/0116935 A1 | 6/2006 | Evans | |
| 2006/0120686 A1 | 6/2006 | Liebenow et al. | |
| 2007/0005576 A1* | 1/2007 | Cutrell et al. | 707/3 |
| 2007/0078846 A1 | 4/2007 | Gulli et al. | |
| 2007/0104348 A1* | 5/2007 | Cohen | 382/100 |
| 2007/0133947 A1 | 6/2007 | Armitage et al. | |
| 2007/0300161 A1* | 12/2007 | Bhatia et al. | 715/745 |
| 2008/0037877 A1 | 2/2008 | Jia et al. | |
| 2008/0046738 A1 | 2/2008 | Galloway et al. | |
| 2008/0059055 A1* | 3/2008 | Geelen | G01C 21/32 701/533 |
| 2008/0082426 A1 | 4/2008 | Gokturk et al. | |
| 2008/0170810 A1 | 7/2008 | Wu et al. | |
| 2008/0177640 A1 | 7/2008 | Gokturk et al. | |
| 2008/0201241 A1* | 8/2008 | Pecoraro | 705/27 |
| 2008/0205755 A1 | 8/2008 | Jackson et al. | |
| 2008/0205764 A1 | 8/2008 | Iwai et al. | |
| 2008/0240575 A1 | 10/2008 | Panda et al. | |
| 2008/0268876 A1* | 10/2008 | Gelfand | G06Q 30/02 455/457 |
| 2008/0278778 A1 | 11/2008 | Saino | |
| 2008/0288338 A1 | 11/2008 | Wiseman et al. | |
| 2008/0288477 A1* | 11/2008 | Kim et al. | 707/4 |
| 2009/0094260 A1 | 4/2009 | Cheng et al. | |
| 2009/0235187 A1* | 9/2009 | Kim et al. | 715/760 |
| 2009/0240735 A1 | 9/2009 | Grandhi et al. | |
| 2009/0304267 A1 | 12/2009 | Tapley et al. | |
| 2009/0325554 A1 | 12/2009 | Reber | |
| 2010/0015960 A1* | 1/2010 | Reber | 455/414.1 |
| 2010/0015961 A1 | 1/2010 | Reber | |
| 2010/0015962 A1 | 1/2010 | Reber | |
| 2010/0037177 A1* | 2/2010 | Golsorkhi | 715/818 |
| 2010/0241650 A1 | 9/2010 | Chittar | |
| 2010/0260426 A1* | 10/2010 | Huang et al. | 382/218 |
| 2010/0281417 A1* | 11/2010 | Yolleck et al. | 715/779 |
| 2010/0332304 A1* | 12/2010 | Higgins | G06Q 30/02 705/14.16 |
| 2011/0029334 A1 | 2/2011 | Reber | |
| 2011/0053642 A1* | 3/2011 | Lee | H04M 1/72563 455/556.1 |
| 2011/0061011 A1* | 3/2011 | Hoguet | 715/769 |
| 2011/0128288 A1* | 6/2011 | Petrou | G06K 9/00664 345/428 |
| 2011/0215138 A1* | 9/2011 | Crum | 235/375 |
| 2011/0313874 A1* | 12/2011 | Hardie | H04W 4/185 705/26.1 |
| 2012/0165046 A1* | 6/2012 | Rhoads et al. | 455/456.3 |
| 2012/0179716 A1* | 7/2012 | Takami | G06F 17/30247 707/771 |
| 2012/0308077 A1* | 12/2012 | Tseng | 382/103 |
| 2013/0073365 A1* | 3/2013 | McCarthy | G06Q 20/02 705/14.23 |
| 2013/0103306 A1* | 4/2013 | Uetake | G01C 21/3605 701/425 |
| 2013/0144701 A1* | 6/2013 | Kulasooriya | G06Q 20/202 705/14.24 |
| 2014/0237352 A1* | 8/2014 | Sriganesh | G06F 16/955 715/234 |
| 2017/0046593 A1 | 2/2017 | Tapley et al. | |

OTHER PUBLICATIONS

"U.S. Appl. No. 12/371,882, Examiner Interview Summary dated Feb. 27, 2012", 3 pgs.

"U.S. Appl. No. 12/371,882, Final Office Action dated Nov. 14, 2011", 21 pgs.

"U.S. Appl. No. 12/371,882, Non Final Office Action dated Jun. 8, 2011", 22 pgs.

"U.S. Appl. No. 12/371,882, Preliminary Amendment filed Feb. 16, 2009", 4 pgs.

"U.S. Appl. No. 12/371,882, Preliminary Amendment dated Jun. 15, 2009", 3 pgs.

"U.S. Appl. No. 12/371,882, Response filed Mar. 14, 2012 to Final Office Action dated Nov. 14, 2011", 10 pgs.

"U.S. Appl. No. 12/371,882, Response filed Sep. 8, 2011 to Non Final Office Action dated Jun. 8, 2011", 13 pgs.

"U.S. Appl. No. 12/398,957 , Response filed Dec. 29, 2011 to Non Final Office Action dated Jul. 29, 2011", 15 pgs.

"U.S. Appl. No. 12/398,957, Non Final Office Action dated Mar. 29, 2012", 23 pgs.

"U.S. Appl. No. 12/398,957, Non Final Office Action dated Jul. 29, 2011", 23 pgs.

"U.S. Appl. No. 12/406,016 , Response filed Sep. 21, 2011 to Non Final Office Action dated Jun. 21, 2011", 17 pgs.

"U.S. Appl. No. 12/406,016, Examiner Interview Summary dated May 15, 2012", 3 pgs.

"U.S. Appl. No. 12/406,016, Final Office Action dated Feb. 29, 2012", 25 pgs.

"U.S. Appl. No. 12/406,016, Non Final Office Action dated Jun. 21, 2011", 21 pgs.

"U.S. Appl. No. 12/406,016, Response filed May 17, 2012 to Non Final Office Action dated Feb. 29, 2012", 16 pgs.

"U.S. Appl. No. 61/033,940, filed Mar. 5, 2008", 56 pgs.

"RedLaser—Impossibly Accurate Barcode Scanning", [Online] Retrieved from the Internet: http://redlaser.com/index.php Visited Jul. 8, 2011, 2 pgs.

"S60 Camera Phones Get Image Recognition Technology", [Online]. Retrieved from the Internet: <URL: http://news.softpedia.com/news/S60-Camera-Phones-Get-Image-Recognition-Technology-79666.shtml>, (Feb. 27, 2008), 2 pgs.

"SnapTell: Technology", [Online]. Retrieved from the Internet: <URL: http://web.archive.org/web/20071117023817/http://www.snaptell.com/technology/index.htm >, (Nov. 17, 2007), 1 pg.

"The ESP Game", [Online]. Retrieved from the Internet: <URL: http://www.espgame.org/instructions.html>, (Downloaded Nov. 13, 2007), 2 pgs.

"YouTube Occipitaihq, RedLaser 2.0: Realtime iPhone UPC barcode scanning", [Online] Retrieved from the Internet: http://www.youtube.com/watch?v=9_6k visited Jul. 8, 2011, (Jun. 16, 2009), 1 pg.

(56) References Cited

OTHER PUBLICATIONS

Gonsalves, Antone, "Amazon Launches Experimental Mobile Shopping Feature", [Online]. Retrieved from the Internet: <URL: http://www.informationweek.com/news/internet/retail/showArticle.jhtml?articleID=212201750&subSection=News>, (Dec. 3, 2008), 1 pg.

Parker, J.R., et al., "Algorithms for Image Processing and Computer Vision", Wiley Computer Publishing, (1997), 23-29.

Patterson, Ben, "Amazon iPhone app takes snapshots, looks for a match", [Online]. Retrieved from the Internet: <URL: http://tech.yahoo.com/blogs/patterson/30983>, (Dec. 3, 2008), 3 pgs.

Terada, S., "New cell phone services tap image-recognition technologies", [Online]. Retrieved from the Internet: <URL: http://search.japantimes.co.jp/cgi-bin/nb20070626a1.html>, (Jun. 26, 2007), 3 pgs.

Von Ahn, Luis, et al., "Labeling images with a computer game", Proceedings of the SIGCHI Conference on Human Factors in Computing Systems, (2004), 319-326.

"U.S. Appl. No. 12/371,882, Examiner Interview Summary dated Nov. 20, 2013", 3 pgs.

"U.S. Appl. No. 12/371,882, Final Office Action dated Mar. 13, 2013", 24 pgs.

"U.S. Appl. No. 12/371,882, Final Office Action dated Dec. 18, 2013", 26 pgs.

"U.S. Appl. No. 12/371,882, Non Final Office Action dated Aug. 30, 2013", 20 pgs.

"U.S. Appl. No. 12/371,882, Non Final Office Action dated Oct. 23, 2012", 21 pgs.

"U.S. Appl. No. 12/371,882, Response filed Jan. 22, 2013 to Non Final Office Action dated Oct. 23, 2012", 12 pgs.

"U.S. Appl. No. 12/371,882, Response filed Jun. 13, 2013 to Final Office Action dated Mar. 13, 2013", 14 pgs.

"U.S. Appl. No. 12/371,882, Response filed Dec. 2, 2013 to Non Final Office Action dated Aug. 30, 2013", 13 pgs.

"U.S. Appl. No. 12/371,882, Response filed May 8, 2014 to Final Office Action dated Dec. 18, 2013", 12 pgs.

"U.S. Appl. No. 12/371,882, Examiner Interview Summary dated Apr. 27, 2016", 3 pgs.

"U.S. Appl. No. 12/371,882, Examiner Interview Summary dated Jul. 21, 2015", 4 pgs.

"U.S. Appl. No. 12/371,882, Final Office Action dated Jun. 25, 2015", 27 pgs.

"U.S. Appl. No. 12/371,882, Non Final Office Action dated Feb. 8, 2016", 37 pgs.

"U.S. Appl. No. 12/371,882, Non Final Office Action dated Mar. 12, 2015", 29 pgs.

"U.S. Appl. No. 12/371,882, Response filed Jun. 12, 2015 to Non Final Office Action dated Mar. 12, 2015", 8 pgs.

"U.S. Appl. No. 12/371,882, Response filed Sep. 25, 2015 to Final Office Action dated Jun. 25, 2015", 13 pgs.

"U.S. Appl. No. 12/371,882,Response filed May 9, 2016 to Non Final Office Action dated Feb. 8, 2015", 14 pgs.

"U.S. Appl. No. 12/371,882, Notice of Allowance dated Jul. 20, 2016", 5 pgs.

"U.S. Appl. No. 15/337,899, Preliminary Amendment filed Nov. 9, 2016", 8 pgs.

Response to First Action Interview—Pre-Interview Communication filed on May 16, 2019, for U.S. Appl. No. 15/337,899, dated Mar. 19, 2019, 10 pages.

First Action Interview—Office Action Summary received for U.S. Appl. No. 15/337,899, dated Jun. 25, 2019, 6 pages.

First Action Interview—Pre-Interview Communication received for U.S. Appl. No. 15/337,899, dated Mar. 19, 2019, 6 pages.

Response to First Action Interview Office Action summary Filed on Sep. 6, 2019, for U.S. Appl. No. 15/337,899, dated Jun. 25, 2019, 14 pages.

Final Office Action received for U.S. Appl. No. 15/337,899 dated Nov. 14, 2019, 20 pages.

Non-Final Office Action received for U.S. Appl. No. 15/337,899 dated Feb. 5, 2020, 11 pages.

Response to Final Office Action filed on Jan. 13, 2020 for U.S. Appl. No. 15/337,899, dated Nov. 14, 2019, 15 pages.

\* cited by examiner

CONTEXTUAL MENUS BASED ON IMAGE RECOGNITION

FIELD

The present disclosure relates generally to information retrieval. In an example embodiment, the disclosure relates to providing contextual menus based on images.

BACKGROUND

Online shopping and other publication systems provide a number of publishing and shopping mechanisms whereby a seller may list or publish information concerning goods or services. A buyer can express interest in or indicate a desire to purchase such goods or services by, for example, responding to a menu presented as a user interface by the online shopping or publication system.

The accurate presentation of online menus that reflect or relate closely to a user's intent is currently a challenge in the field of information retrieval. An example of such a challenge is that menus are usually static and are uniquely defined by sellers. Buyers seeking goods or services might be interested in a different good or service than that offered in a traditional menu provided online for goods or services. As a result, publication systems such as online shopping systems that use a conventional search engine to locate goods and services may not effectively connect the buyers to the sellers and vice versa.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments. It will be evident, however, to those skilled in the art that embodiments of the inventive subject matter may be practiced without these specific details. In general, well-known instruction instances, protocols, structures and techniques have not been shown in detail.

The embodiments described herein provide techniques for providing contextual menus based on images submitted to a network based publication system by way of photographs. The submission may be by way of a network such as, in one embodiment, the Internet, either by wire coupling or wirelessly. Other networks, such as a LAN or other internal or external networks, may be used. As part of identification functionality, images depicting a variety of locales such as businesses, or other items, may be stored in an image repository in, for example, the network-based publication system (e.g., an online shopping system). The stored images in the image repository may be used to identify images that users may submit as photograph images taken by cell phone, camera, webcam, or even by a laptop with camera capability, Alternatively, the publication system may identify the submitted image by performing a location based Internet search based on the submitted image, or based on the location of the camera that supplied the image. Identification of the image may be based on identifying a well known logo or trademark. Image recognition could be based on recognition of an image of the building stored in the system's image repository. The system may then, after categorizing the image, provide the user a menu relating to the photograph, the menu based on context rather than being a generic form of menu. That is, the submitted image, and what the user might want to do with respect to the image at the specific moment when he or she is capturing the image, is a primary consideration for the menu.

A technique for image identification may be seen in U.S. patent application Ser. No. 12/371,882 filed Feb. 16, 2009, entitled "Identification of Items Depicted in Images," and assigned to the assignee of the present application. The application identified in the previous sentence is incorporated herein by reference in its entirety. The foregoing application explains in greater detail a technique by which an item depicted in an image may be identified by matching the image with user submitted images stored in the repository. In some embodiments the match may be based on a comparison of the color histograms of the images.

If, for example, a user takes a photograph image of a restaurant at a given locale, the system would attempt to determine what the user may want to do when taking the picture of the restaurant. Some possibilities might be that the user wants to order something, and the user would like to make a decision based on a contextual menu that is based on that image rather than having a generic menu. Or the user may want to check on the status of a take-out order he has placed with the restaurant. In the latter case, the user may have been given an order number at the time of placing the take out order, and the menu presented by the system could be a user interface that provides the user with the opportunity of entering the order number and the system would then return, for example, the status of the order and when it would be ready for pickup. The system processes the image and identifies it as a restaurant and presents a category driven menu to the user with various selectable options such as, "call the restaurant," or "view the menu from the restaurant."

In another example, if the image is of, say, a local ATT® office, the system may filter and process the image, identify the image as that of an ATT store, categorize the image as an ATT store, and present a category driven menu to the user with various selectable options. In this situation since the image is that of an ATT office, information relating to ATT is available as public information on the internet. The user might be presented with a menu from the web site relating to ATT, with an option for the various services or upgrades offered by ATT. These might include view your bill, pay your bill, see your upgrade options, technical support, new services, and the like. The menu may provide the user with the option of entering or selecting the user's account number in order to see the amount of the current phone bill, to pay the bill, and similar functions and services. For example, options may also including pay your bill by a payment processing system. An example of such a system is Pay-Pal™. Since the foregoing information can be provided as public information, such as that available on the business's website, it is not necessary for the specific entity to be a subscriber to a service on the publication system in order for the function to be performed.

As an example of implementing the foregoing functions, if a user were walking down the street and uses a cell phone camera to take a picture of a sandwich shop, the system may identify the image by the search and comparisons discussed above. Alternatively, the system may determine by GPS or other geographical locating system what buildings are in the local area. The system may then compare the image with stored images of businesses in that local area and identify the image in that manner. When identified as a sandwich shop, if the sandwich shop has its own website, the system may provide a menu based on the website. If the sandwich shop does not have its own website, it may decide to register with the publication system and provide information for the publication system to present with the menu. For, if registered, the business could then provide the publication system with a photograph of one or more of its business location to store in the image repository discussed above, for image identification purposes. The business that registers may also provide menu information both in the initial registration and on a continuing basis for storage in a database for presentation to a user upon receipt of a photograph of the business location taken by or for the user. Again using a restaurant as an example, the registering restaurant may upload its menu, take out options, hours of business, and other details to the publication system. Further, on a continuing basis, say, for example, daily, the restaurant could provide the specials of the day, which could be updated in the database for presentation to the user as indicated in the foregoing sentence.

If the image is that of a popular restaurant like P.F. CHANG'S™ restaurant that has its own website, the system could link to, as discussed above, the vendor's main website and present a menu or other information to the user based on the website. In addition, businesses such as restaurants, as only one example of many businesses, may wish to register with the publication system even if the business is a well known business with its own website. This would be done for the reasons outlined above for businesses that are not well known.

Further, the user may be provided with the category in which the publication system categorizes the business and may be given the opportunity of changing the category if the user believes changing the category would yield a response from the system that more nearly meets the user's desires at the moment. An example of the statement can be a business called "Club One". In California, this business corresponds to a fitness club/gym. But elsewhere it can be a dance club. Hence the user will be provided with the option to change the original category the image gets sorted into. Further still, the publication system may also provide the business with information indicating the category in which the system placed the business, and provide the business with the opportunity of changing its category if the business believes a different category would be beneficial. The same example may be given for this statement as well. If "Club One" fitness club registers for the service and is categorized as a dance club, the business will also be provided with the choice of changing the category of the business from a dance club to a fitness club.

Figure 1:
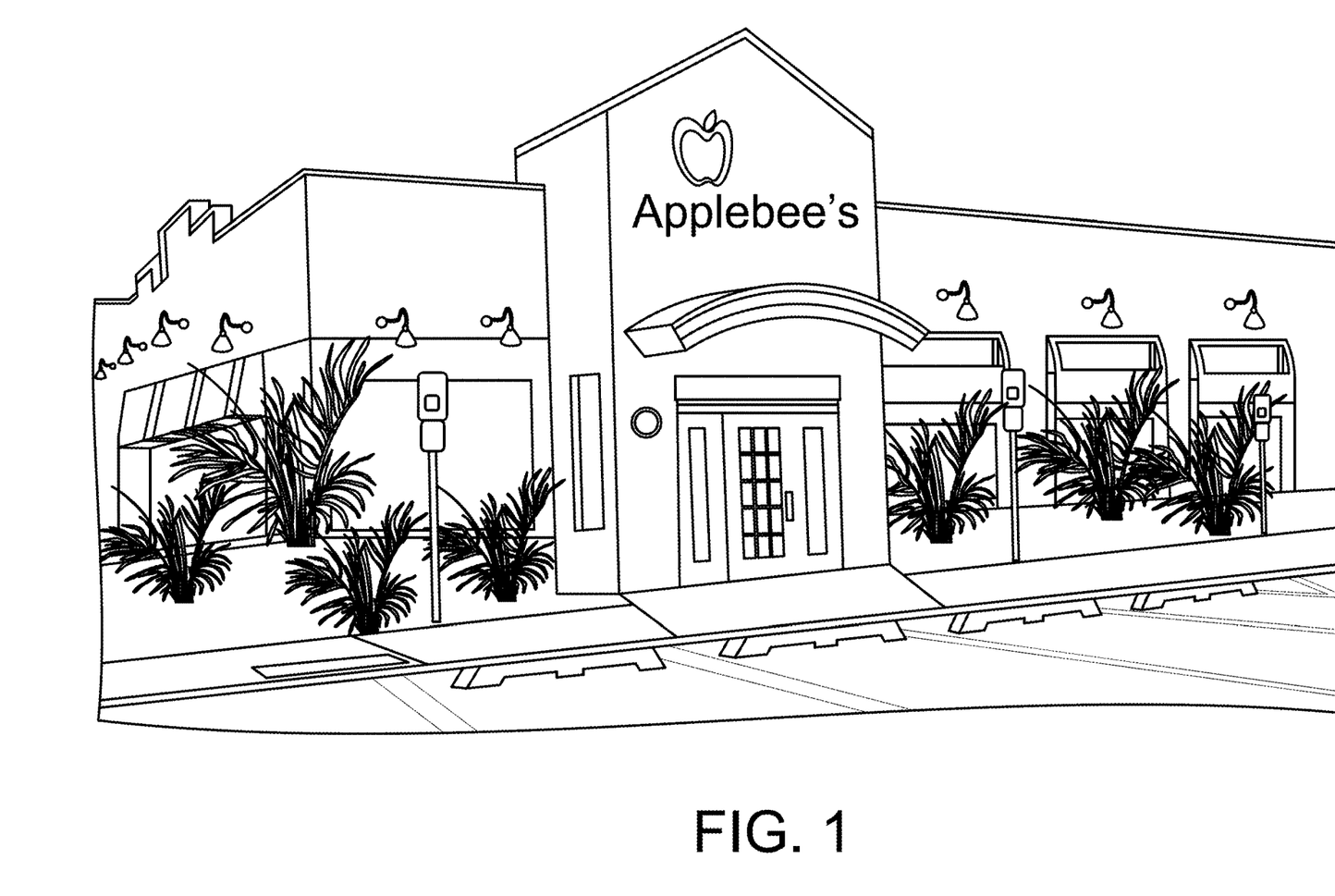
FIG. 1 is a photograph image that may, in accordance with an illustrative embodiment, be submitted for identification and for obtaining a menu related to the image for a good or service desired by a user.

FIG. 1 is a photograph image that may be submitted for identification and for obtaining a menu related to the image for a good or service desired by a user, sometimes referred to herein as a contextual menu. The photograph may be taken by the user or by some other person. While the photograph is that of a well known restaurant, it may be of any business, for example a local, non-nationally known restaurant, a phone company, or any other business, item or locale.

Figure 2:
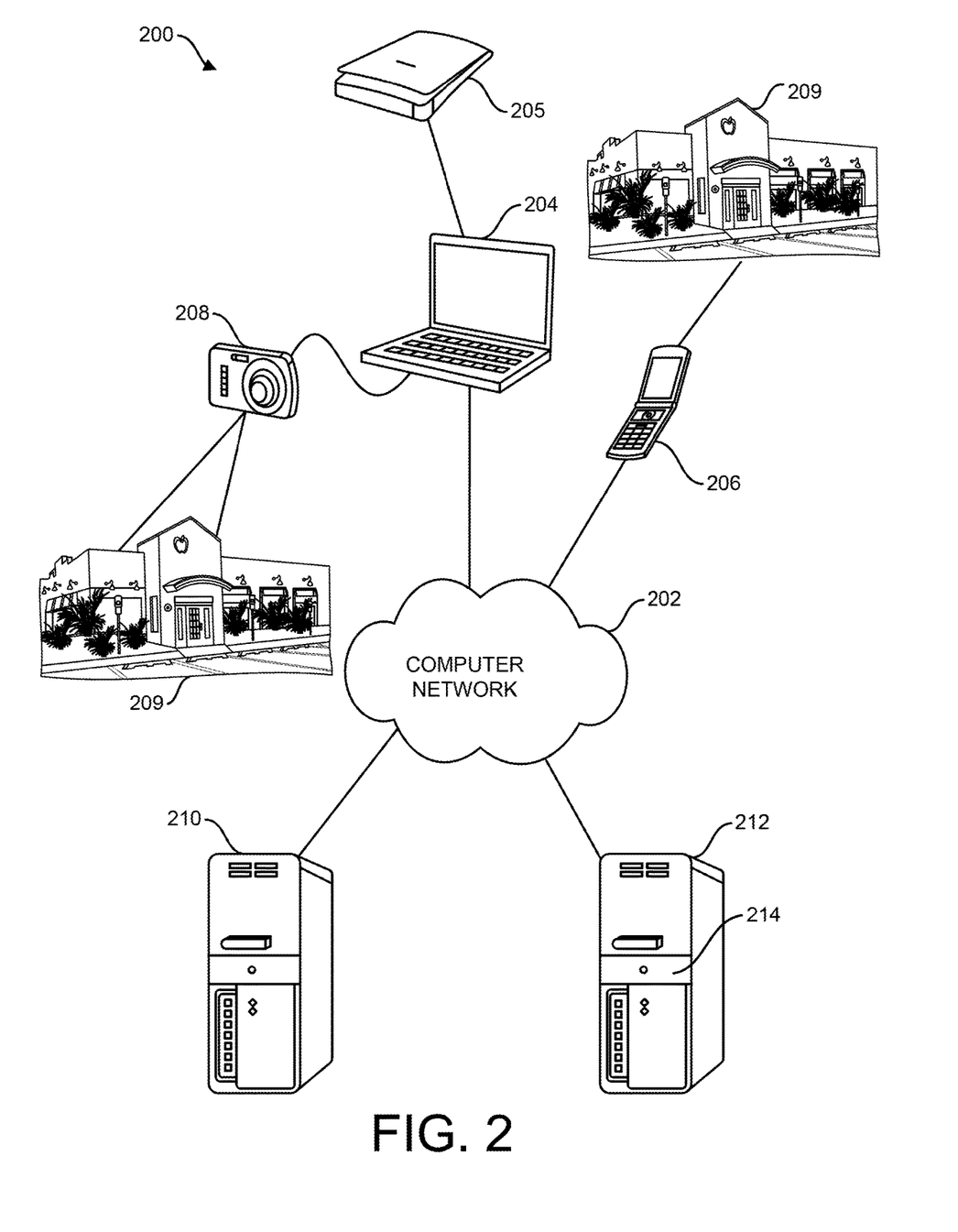
FIG. 2 is a diagram depicting a system, in accordance with an illustrative embodiment, for providing the image of FIG. 1 to a publication system.

FIG. 2 is a diagram depicting a system 200, in accordance with an illustrative embodiment, for identifying items depicted in images. As depicted, the system 200 includes client processing systems (e.g., personal computer 204, mobile phone 206, or similar device) a server 210 hosting a variety of services, and another server 212 hosting an item recognition module 214, which are all interconnected by way of a computer network 202. The computer network 202 is a collection of interconnected processing systems that communicate utilizing wired or wireless mediums. Examples of computer networks, such as the computer network 202, include Local Area Networks (LANs) and/or Wide-Area Networks (WANs), such as the Internet.

In the example of FIG. 2, a client processing system (e.g., personal computer 204 or mobile phone 206) transmits an image of an item 209 to the image recognition module 214, which is hosted on the server 212. The image may be captured by a camera built-in the mobile phone 206 or by a camera 208, which is configurable to download its stored images to the personal computer 204. Further the submitted image could be an already existing photograph or other images capable of being submitted to the publication system by, for example, upload. Alternatively, the user may locate the image through, for example, the Internet or other image repositories and submit it to the system.

The image recognition module 214 accesses the image from the client processing systems and, as explained in more detail below, identifies the item 209 depicted in the image with an item identifier. The item 209 may be, in one embodiment, a business. An "item identifier," as used herein, refers to a variety of values (e.g., alphanumeric characters and symbols) that establish the identity of or uniquely identify one or more items, such as item 209. For example, the item identifier can be a name assigned to the item 209. In another example, the item identifier can be a barcode value (e.g., Universal Product Code (UPC)) assigned to the item 209. In yet another example, the item identifier can be a title or description assigned to the item 209.

In an embodiment, the item recognition module 214, which may include a categorization module to categorize the identified image, may then transmit the item identifier to a service hosted on the server 210 to locate item data. The "item data," as used herein, refer to a variety of data regarding one or more images, in one embodiment a business, depicted in an image, the data posted or associated with the image. Such item data, for example, may be stored with the images or at other locations. Examples of item data may include, in one embodiment, menus related to the business or item. The menus may include locations of the business, prices of the goods or services offered by the business, quantities of the items available at or through the business, availability of the items at the business, and other item data. It should be appreciated that the item recognition module 214 may access a variety of different services by way of, for example, a Web-exposed application program interface (API). In an alternate embodiment, the item recognition module 214 may be embodied with the service itself where, for example, the item recognition module 214 may be hosted in the server 210 with the other services.

The system 200 may also include a global positioning system (not shown) that may be attached to or included in the client processing systems. The client processing systems can transmit the coordinates or location identified by the global positioning system to the services hosted on server 210 and, for example, the services can use the coordinates to locate nearby stores that sell the item 209 depicted in the image.

Figure 3:
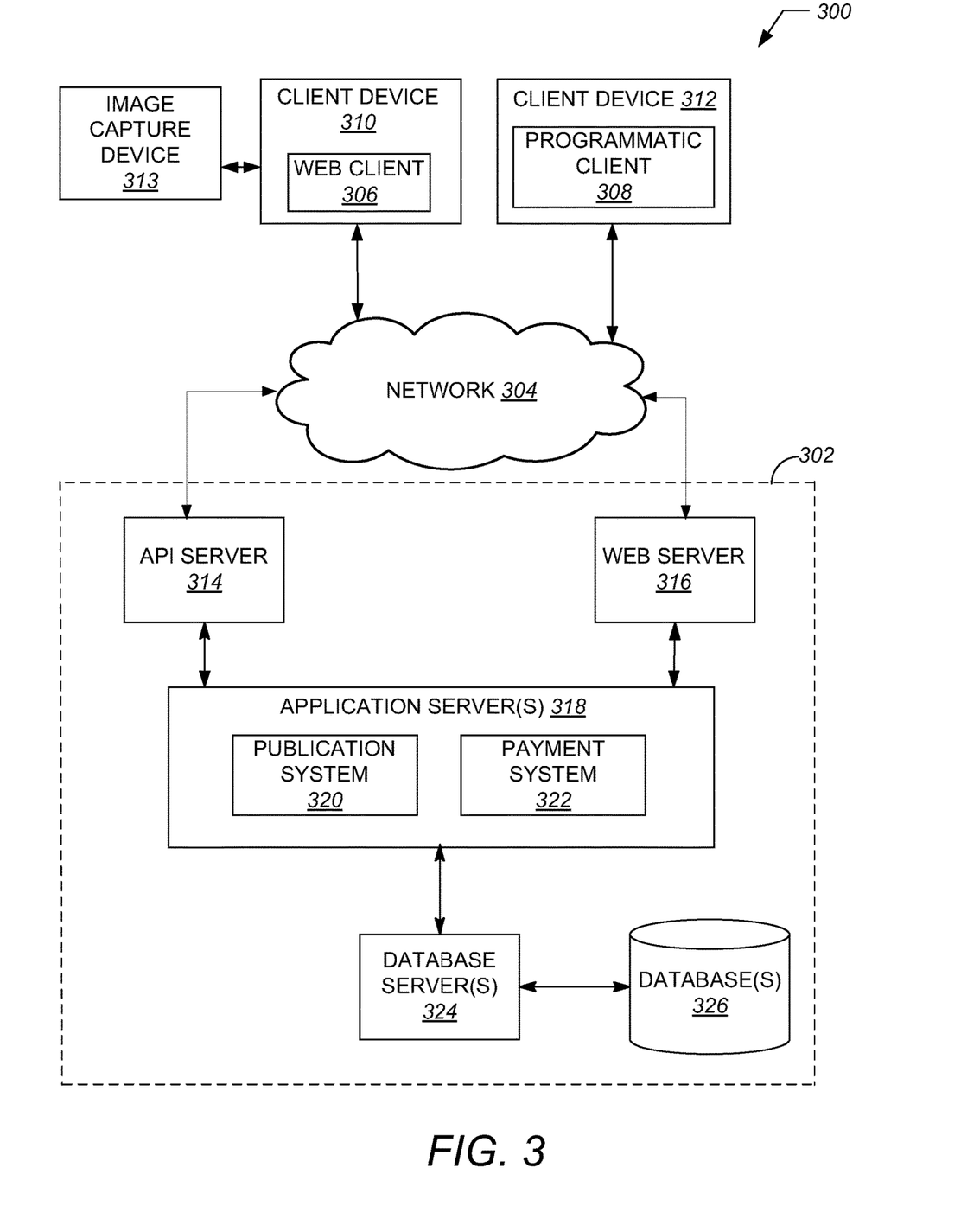
FIG. 3 is a diagram depicting a publication system, in accordance with an illustrative embodiment, that identifies items depicted in images and provides menus relating to the items and that are desired by a user.

With reference to FIG. 3, an example embodiment of a high-level client-server-based network architecture 300, more detailed then FIG. 2, which may include the servers 210 and 212 of FIG. 2. A networked system 302, in an example form of a network-server-side functionality, is coupled via a communication network 304 (e.g., the Internet, wireless network, cellular network, or a Wide Area Network (WAN)) to one or more client devices 310 and 312. FIG. 3 illustrates, for example, a web client 306 operating via a browser (e.g., such as the INTERNET EXPLORER® browser developed by Microsoft® Corporation of Redmond, Washington State), and a programmatic client 308 executing on respective client devices 310 and 312.

The client devices 310 and 312 may comprise a mobile phone, desktop computer, laptop, or any other communication device that a user may utilize to access the networked system 302. In some embodiments, the client device 310 may comprise or be connectable to an image capture device 313 (e.g., camera, camcorder). In further embodiments, the client device 310 may comprise one or more of a touch screen, accelerometer, microphone, and GPS device. The client devices 310 and 312 may be a device of an individual user interested in visualizing an item within an environment.

An Application Program Interface (API) server 314 and a web server 316 are coupled to, and provide programmatic and web interfaces respectively to, one or more application servers 318. The application servers 318 host a publication system 320 and a payment processor, or payment system, 322, each of which may comprise one or more modules, applications, or engines, and each of which may be embodied as hardware, software, firmware, or any combination thereof. The application servers 318 are, in turn, coupled to one or more database servers 324 facilitating access to one or more information storage repositories or database(s) 326. The databases 326 may also store user account information of the networked system 302 in accordance with example embodiments.

In example embodiments, the publication system 320 publishes content on a network (e.g., Internet). As such, the publication system 320 provides a number of publication functions and services to users that access the networked system 302. The publication system 320 is discussed in more detail in connection with FIG. 4. In example embodiments, the publication system 320 is discussed in terms of a marketplace environment. However, it is noted that the publication system 320 may be associated with a non-marketplace environment such as an informational or social networking environment.

The payment system 322 provides a number of payment services and functions to users. The payment system 322 allows users to accumulate value (e.g., in a commercial currency, such as the U.S. dollar, or a proprietary currency, such as "points") in their accounts, and then later to redeem the accumulated value for products (e.g., goods or services) that are made available via the publication system 320 or elsewhere on the network 304. The payment system 322 also facilitates payments from a payment mechanism (e.g., a bank account, PayPal™, or credit card) for purchases of items via any type and form of a network-based marketplace.

While the publication system 320 and the payment system 322 are shown in FIG. 3 to both form part of the networked system 302, it will be appreciated that, in alternative embodiments, the payment system 322 may form part of a payment service that is separate and distinct from the networked system 302. Additionally, while the example network architecture 300 of FIG. 3 employs a client-server architecture, a skilled artisan will recognize that the present disclosure is not limited to such an architecture. The example network architecture 300 can equally well find application in, for example, a distributed or peer-to-peer architecture system. The publication system 320 and payment system 322 may also be implemented as standalone systems or standalone software programs operating under separate hardware platforms, which do not necessarily have networking capabilities.

Figure 4:
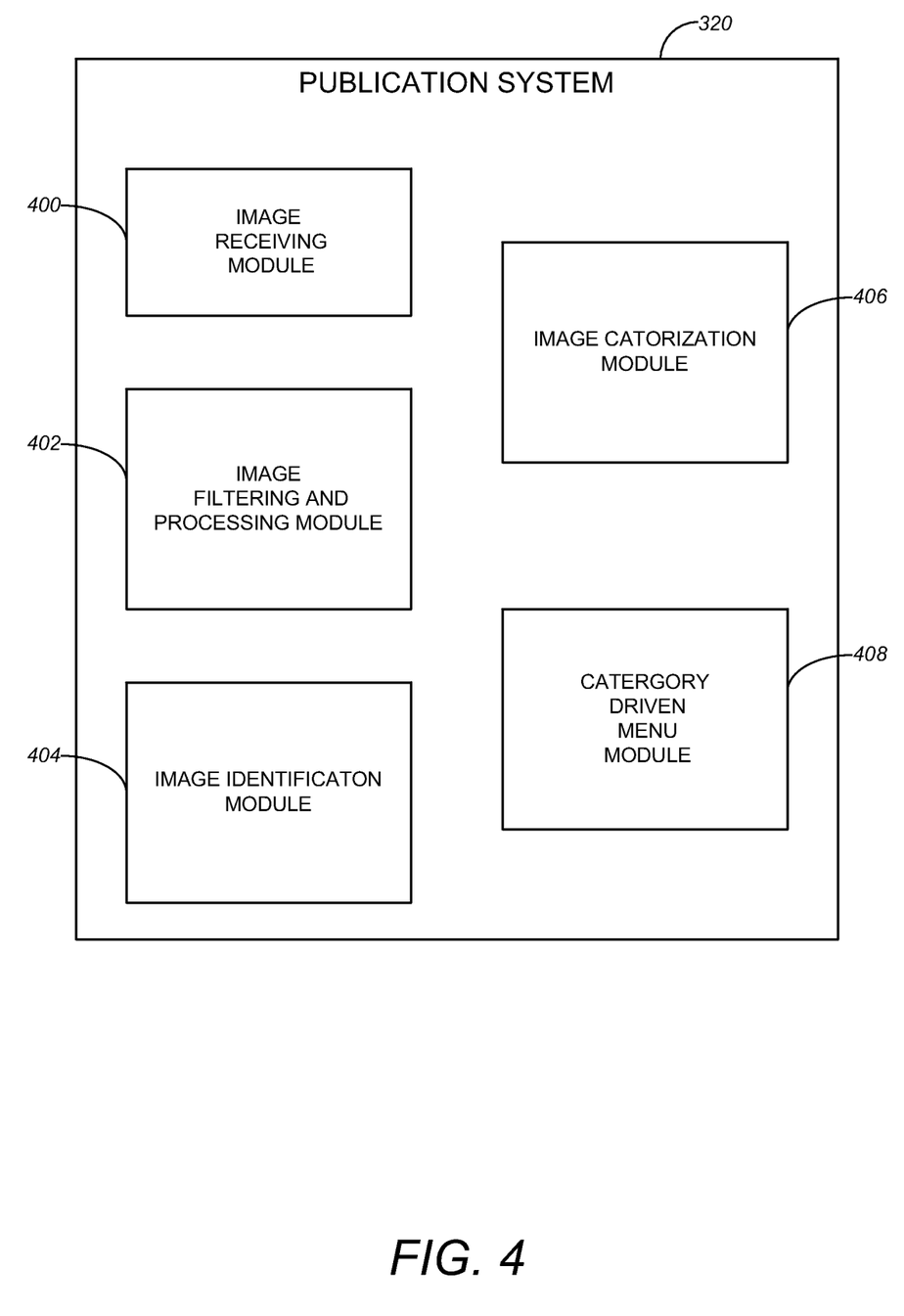
FIG. 4 is a block diagram illustrating an example embodiment of a publication system.

Referring now to FIG. 4, an example block diagram illustrating multiple components that, in one embodiment, are provided within the publication system 320 of the networked system 302 is shown. In one embodiment, the publication system 320 is a marketplace system where items (e.g., goods or services) may be offered for sale. In an alternative embodiment, the publication system 320 is a social networking system or information system. The publication system 320 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 326 via the one or more database servers 324.

In one embodiment, the publication system 320 provides a number of mechanisms whereby the system 320 may publish menus relating to goods or services of a seller or business, a buyer can express interest in or indicate a desire to purchase such goods or services based on an image, and a price can be set for a transaction pertaining to the goods or services. To this end, the publication system 320 may comprise at least one image receiving module 400, one or more image filtering and processing module 402, one or more image identification module 404, one or more image categorization module 406, and one or more menu generation module 408.

An image receiver module 400 is an image receiver that receives images that are uploaded to the publication system by a user that are identified and categorized by the publication system and then used in retrieving menus that, based on the categorization, relate to the image and are desired by the user.

An image filtering and processing module 402 provides well known functionality for filtering and processing image information in order to remove image defects such as, in one embodiment, defects that lead to undesired red-eye or other flash characteristics. This may allow more effective identification of the image.

An image identification module 404 allows identification of the image submitted by the user. As explained in more detail in the above-incorporated application, an item depicted in an image may be identified by matching the image known images stored in an image repository. In some embodiments, also as explained in the foregoing application, the match may be based on a comparison of the color histograms of the images.

An image categorization module 406 allows categorization of images identified by image identification module 404. An example of such image categorization is disclosed in U.S. patent application Ser. No. 11/952,026 entitled "Image Categorization Based on Comparisons between Images" filed on Dec. 6, 2007 and assigned to the assignee of the present application. The foregoing application is hereby incorporated herein by reference in its entirety.

A category driven menu module 408 allows generation of category specific menus. For example, if the image is of a restaurant, the menu generation module could generate, as one example, a link to the restaurant's main website, providing menus, directions to the business, hours of operation, specials of the day, take-out information, and the like. This will be discussed in further detail below. For example, the category driven menu module 408 may also deliver menus by electronic mail (e-mail), instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

Although the various components of the publication system 320 have been defined in terms of a variety of individual modules and engines, a skilled artisan will recognize that many of the items can be combined or organized in other ways. Alternatively, not all components of the publication system 320 of FIG. 4 may be utilized. Furthermore, not all components of the publication system 320 have been included in FIG. 4. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 4A:
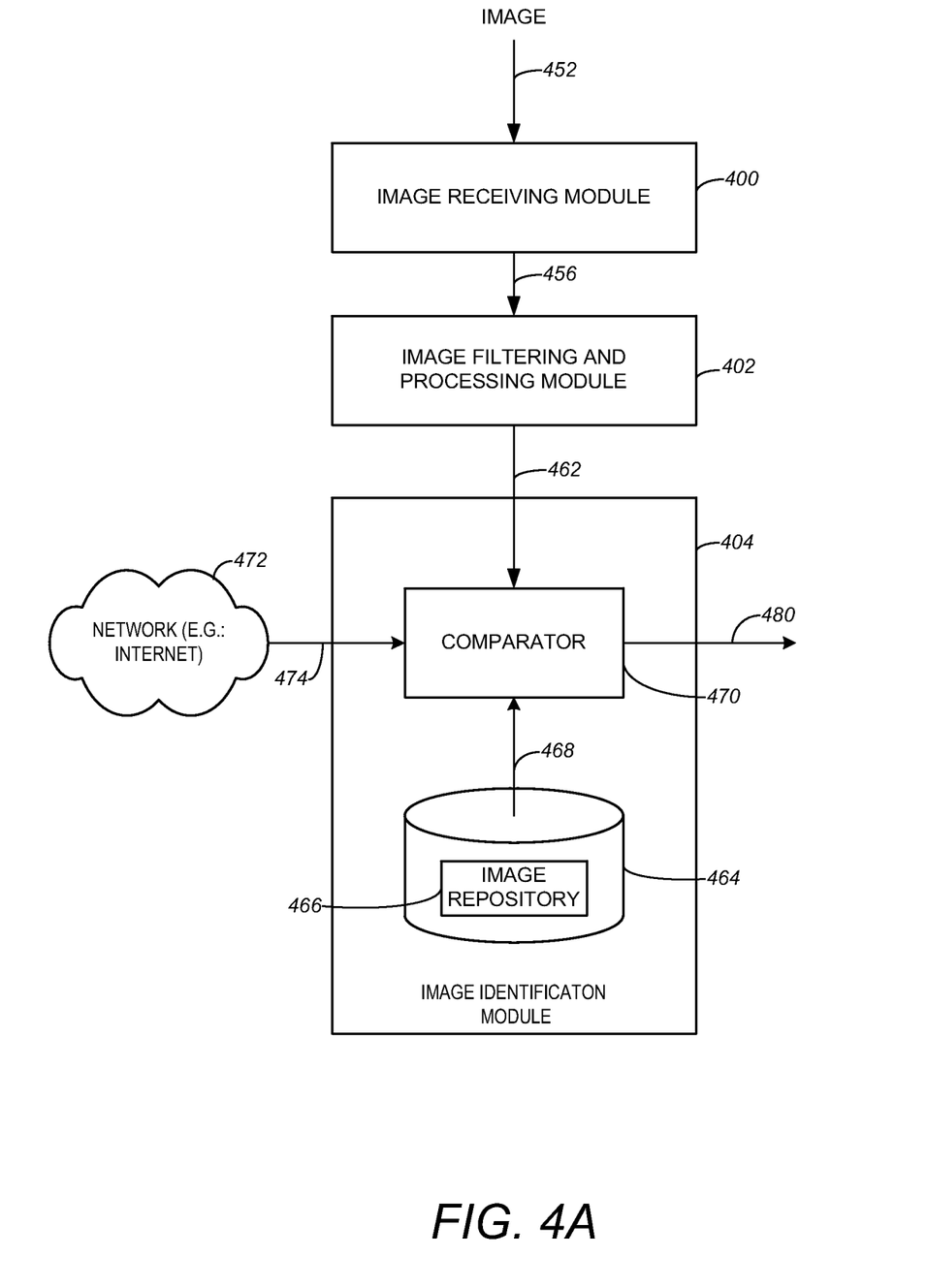
FIG. 4A is an illustration of various modules of an implementation of an image identification module useful in an example embodiment.

FIG. 4A is an illustration of various modules of an implementation of an image identification module useful in an example embodiment image identification module 406 comprises database 464 which includes image repository 466. Database 464 may be included as part of database 326 of FIG. 3. Image repository 466 may be used for storing images that are to be compared to an image which may be received from a user over line 452 at image receiving module 400. The image may be filtered and processed at image filtering and processing module 402 to remove or minimize defects. The filtered image enters image identification module 404 over line 462. The image over line 462 and comparison images from repository 466 are compared in comparator 470. If there is a successful identification, the image identification information is provided over line 480. Alternatively, the image over line 462 may be compared in comparator 470 with images obtained from network 472 over line 474, identification information again being provided over line 480.

Figure 5:
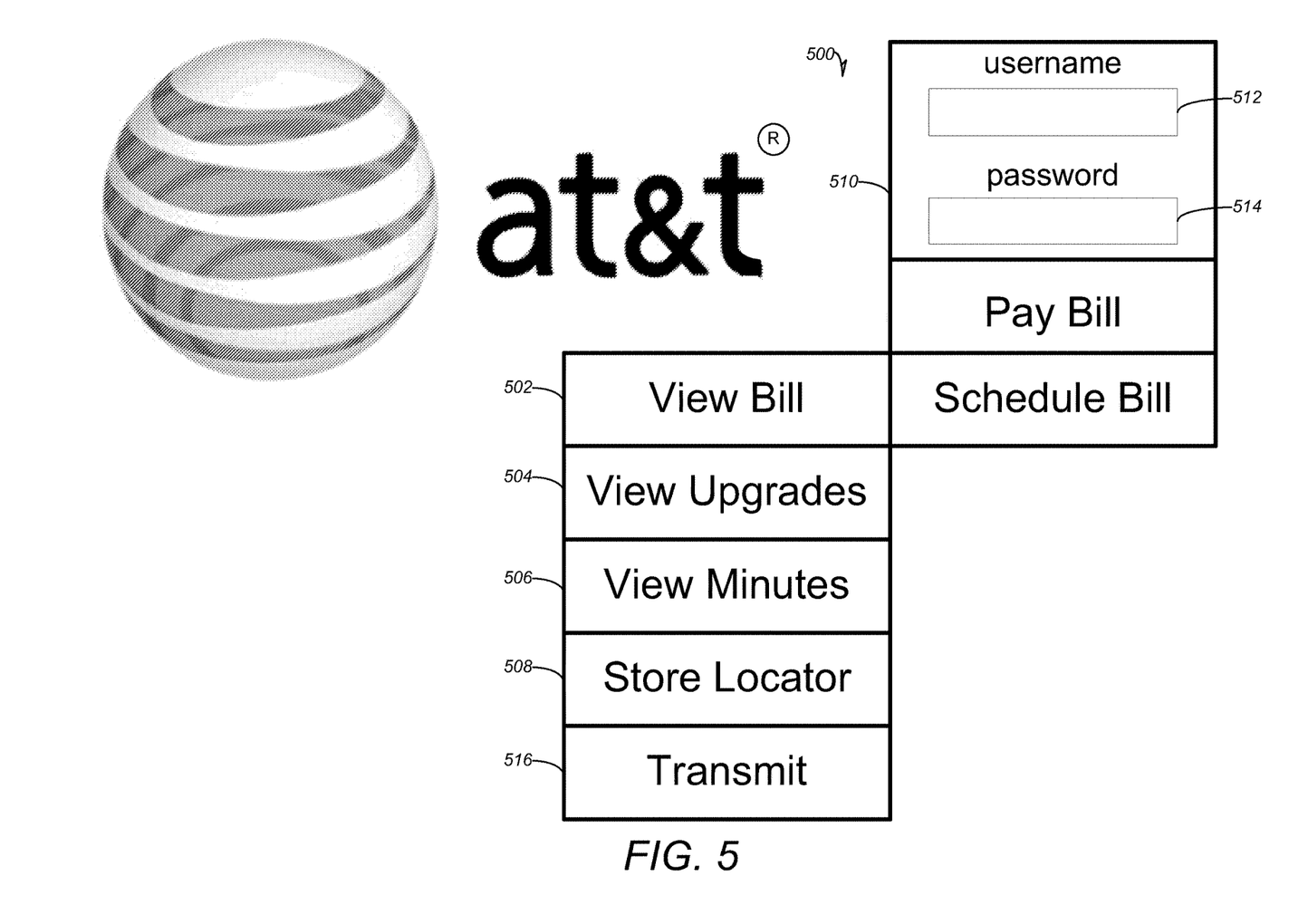
FIG. 5 is an illustration of a contextual menu in accordance with an illustrative embodiment.

FIG. 5 is an illustration of a contextual menu 500 in accordance with an exemplary embodiment. Consider for example, if the image of the menu relates to, say, a local ATT office, the system may filter and process the image, identify the image as that of an ATT store, categorize the image as an ATT store, and present a category driven menu to the user with icons selectable by the user and space for entering information by the user. The possible options may be selectable icons to "View Bill" 502, or "View Upgrades" 504, or "View Minutes" 506, "Store Locator" 508, among others. User space 510 may, in the embodiment under discussion, include space 512 for user name and space 514 for user password. For example, if the user selects View Bill 502, he or she may be prompted also to include name and password for the appropriate account for transmission to the ATT organization via a transmit radio button such as 516.

Figure 6:
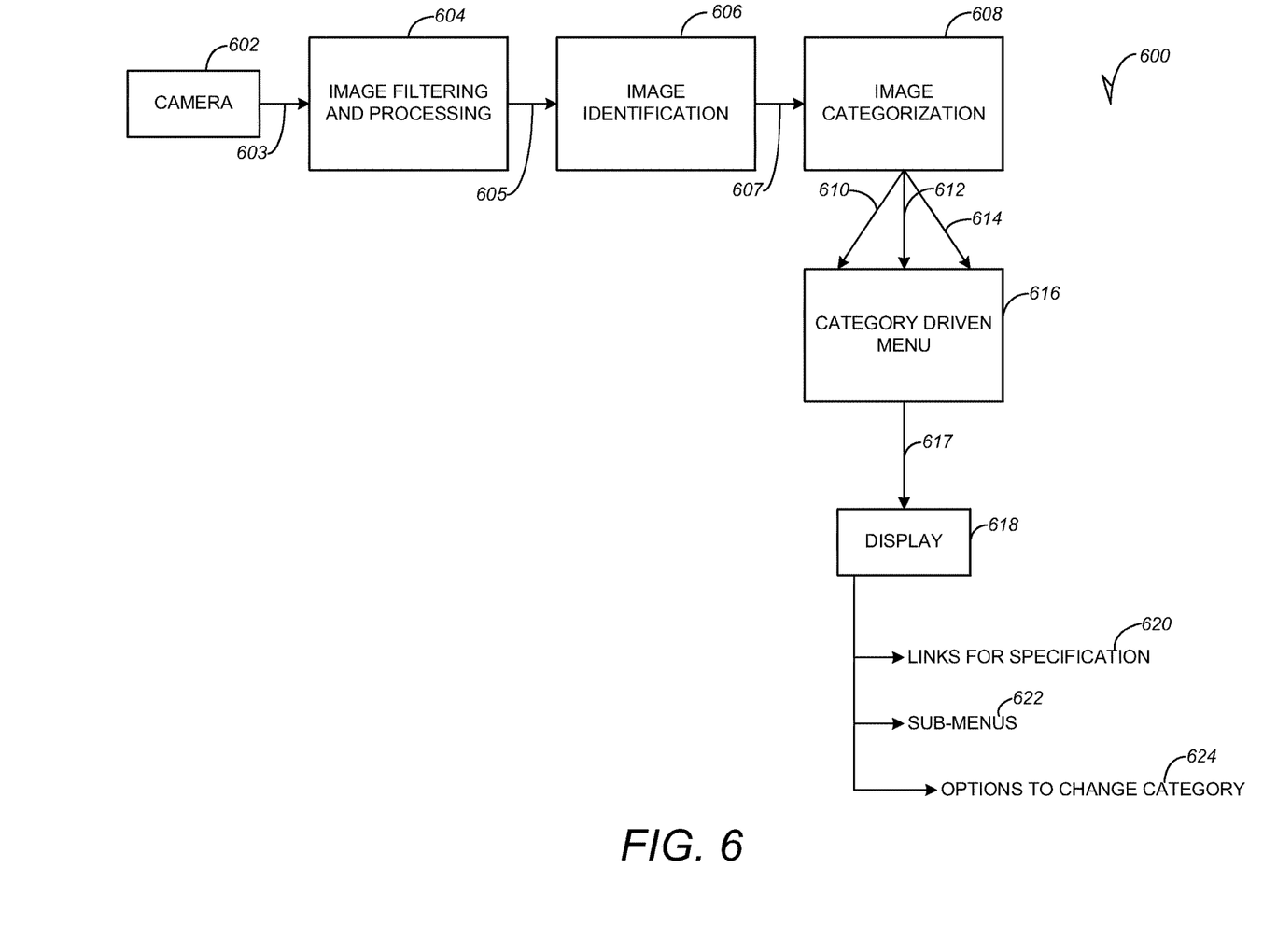
FIG. 6 is a flow chart illustrating a method useful in an example embodiment for providing to users contextual menus relating to the images provided to the system seen in FIGS. 2 and 3.

FIG. 6 is a flow chart illustrating a method useful in an example embodiment for providing to users contextual menus relating to the images provided to the system seen in FIGS. 2 and 3. Camera 602 may be in a cell phone, personal digital assistant, or laptop, or it may be another camera, or a webcam. An image such as from a photograph is transmitted from the camera 602 for image filtering and processing at image filtering and processing module 402 of FIG. 4. This image may be transmitted as described above with respect to FIG. 2, FIG. 3, and FIG. 4A. Image filtering and processing module 402 includes filtering software to process the image to remove issues that militate against identification of the image. For example issues such as redeye and other anomalies caused by flash are removed by well known means. The filtered image is transmitted over line 605 for image identification at image identification module 404 of FIG. 4A, which identifies the image transmitted by camera 602. For example, if the image is letters, if may be identified by comparison to stored letters, including trademarks and logos. If the image is a building, it may be identified by comparison with stored images of buildings. Comparison may be by comparator 470 of FIG. 4A, the comparison being to images stored in repository 466 of database 464 for identification, or to images from Internet 472 of FIG. 4A. The identified image, or information that represents the identified image, is transmitted over line 607 for categorization at image categorization module 406 of FIG. 4. Image categorization module 406 categorizes the identified image into a particular category based on the identity such as, for example, ATT office 610, McDonalds® 612, bakery shop 614, and the like. Based on the categorization, the image categorization module sends an appropriate identifier, by way of one of lines 610, 612, . . . , 614, to category driven menu module 616 which will provide the appropriate menu for rendering for the user at display 618. In the described embodiment, the category of the image determines what the menu options might be for the particular image. If the business is widely known, such as ATT, the, the business's website might be provided by category driven menu module 616. If the identified business is not widely known, and the business subscribes with the publication system for the service described herein, the category driven menu module 616 provides the menu determined by the subscribing business.

Figure 7:
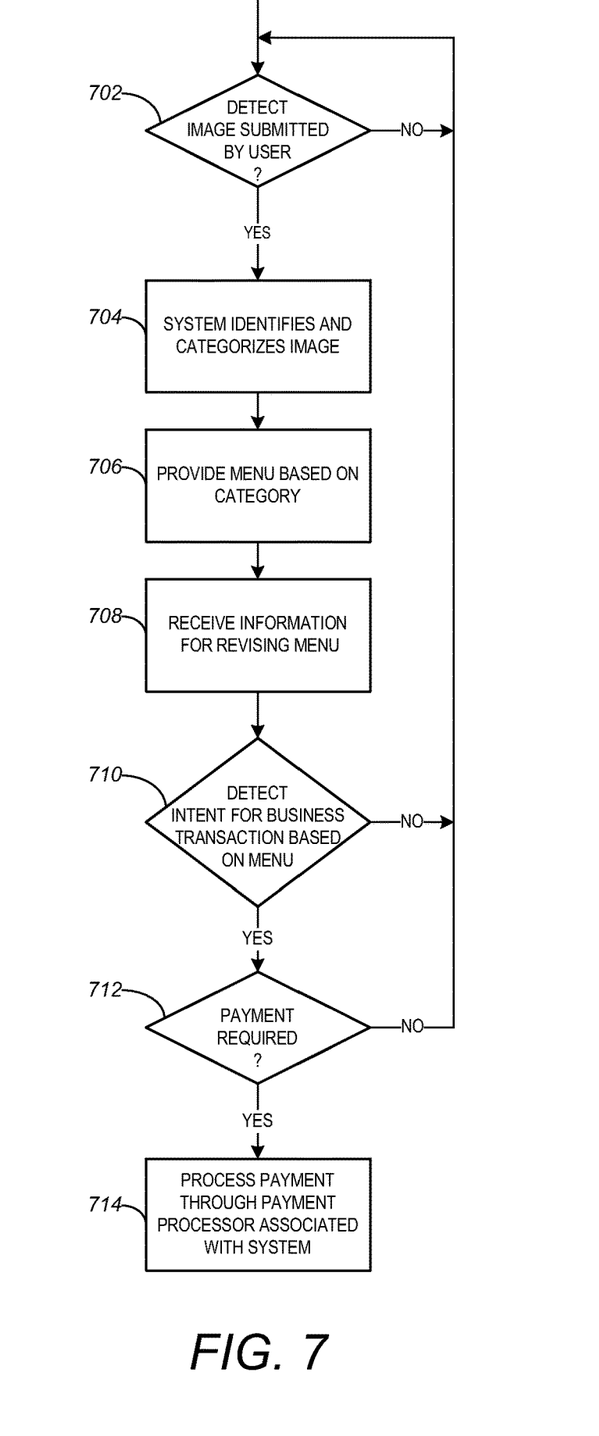
FIG. 7 is a flow chart further illustrating the method of FIG. 6.

The links in the menu will be provided in the user interface. Links for specifications 620 may be, in one example, for the example in which the business is a restaurant, a link to the restaurant's website that displays a menu or other business information. As another example, if the image is of, say, a local ATT office, the system may filter and process the image, identify the image as that of an ATT store, categorize the image as an ATT store, and present a category driven menu to the user with various selectable options. The possible options may be to "View the bill" or "View Minutes" or "Store Locator" etc. A possible submenu for "View Bill" might be "Pay Bill" or "Schedule a payment" Sub-menus 622 may be, if the restaurant is a subscriber and, for example, has menus describing daily specials, the daily special could be a submenu that could be linked to. Option to change category 624 provides the user an option to change the category in case the user believes that the category determined by image categorization module 608 may not be appropriate for the image. For example, if the user takes a picture of, say, a coffee shop like Starbuck's, and the image is identified and categorized as a restaurant instead of a coffee shop, a menu the system determines is appropriate is forwarded by category driven menu module 616, which may be accompanied by option to change category 624, which may be selectable, that gives the user the option of changing the category from restaurant to coffee shop. FIG. 7 is a flow chart further illustrating a method according to another embodiment. In operation 702, the system searches to detect, by image receiving module 400, an image submitted by the user. If the image is detected, at the Yes leg, the system at 704 identifies and categorizes the image, by use of image identification module 404 and image categorization module 406. If the No leg is taken, operation 702 continues. After image identification and categorization, operation 706 provides a menu, sometimes called a specification, based on the category. In operation 708 the system may receive information from the user for modifying the menu to make the menu relate more closely to the intent of the user who submitted the image. Consider the example of "ClubOne", which can either be a health club or a dance club, since both share the same name. If the user submitted the image of ClubOne, the dance club, but the system categorizes that image as a health club, the user can change the category of the image to dance club. By doing so, he/she can receive relevant menu options for a dance club such as "View events", or "View DJ" or "Buy tickets". Operation 710 tests to detect whether the intent of the user is to conclude a business transaction based on the menu. If Yes then, optionally, operation 712 determines whether payment is required. If yes, the system processes payment through a payment processor associated with the system, such as payment system 322. In the case of a No decision at steps 710 and 712, the system returns to the detection operation at 702.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 8:
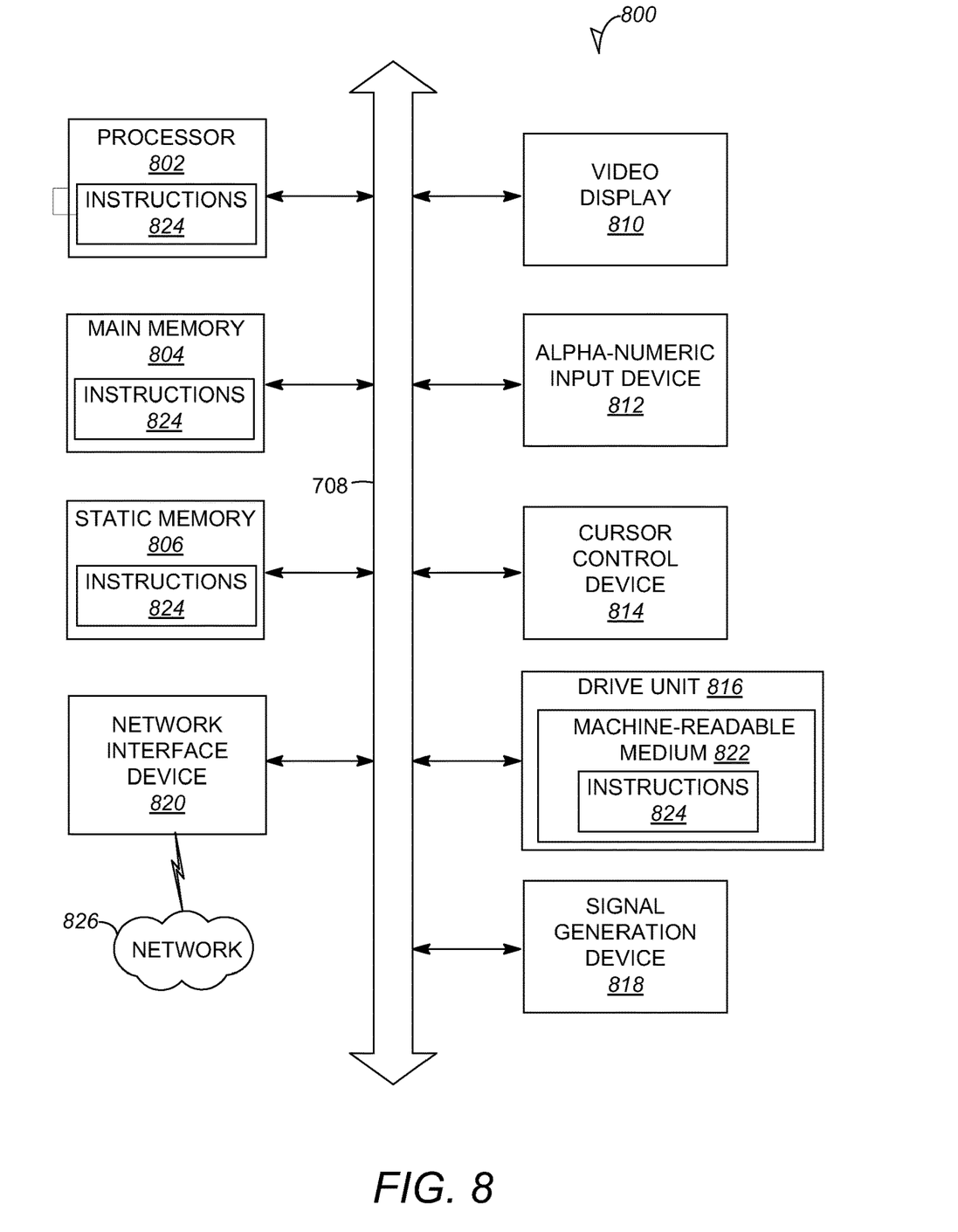
FIG. 8 is a block diagram depicting a machine in the example form of a processing system within which a set of instructions, for causing the machine to perform any one or more of the methodologies discussed herein, may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Storage Medium

The disk drive unit 816 includes a machine-readable storage medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, with the main memory 804 and the processor 802 also constituting machine-readable media.

While the machine-readable storage medium 822 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    identifying an image depicting a physical item, the image captured on a client device;
    generating an initial categorization that the physical item is in an initial category based at least in part by comparing image characteristics of the image to a set of images depicting different physical items in the initial category;
    generating, based at least in part on the generated initial category, a graphical user interface (GUI) for the client device, the GUI comprising a first network site menu that is automatically selected based on the initial category, the first network site menu being configured to transmit a data item input into the first network site menu to a first network site, the first network site menu further comprising a replace network site menu option to replace the automatically selected first network site menu with a second network site menu of a second network site based on the initial categorization that was generated using image characteristics being incorrect;
receiving, from the client device that generated the image, selection of the replace network site menu option to replace the automatically selected first network site menu using a further category associated with the image; and
generating, for the client device and in response to the received selection of the replace network site menu option, a further GUI comprising the second network site menu pre-associated with the further category, the second network site menu configured to transmit a further data item input into the second network site menu to the second network site that is different from the first network site, the further data item and the data item being differently formatted data.

2. The method of claim 1, further comprising:
receiving, from the first network site, a first set of content to include in the first network site menu; and
receiving, from the second network site menu, a second set of content to include in the second network site menu.

3. The method of claim 2, further comprising:
causing, on the client device, display of the GUI comprising the first network site menu; and
causing, on the client device, display of the further GUI comprising the second network site menu after receiving selection of the replace network site menu option.

4. The method of claim 3, further comprising:
receiving updates to the first set of content from the first network site and receiving additional updates to the second set of content from the second network site; and
updating the first network site menu using the updates received from the first network site and updating the second network site using the additional updates received from the second network site.

5. The method of claim 1, wherein the first network site menu includes a text input field configured to receive first identification data identifying a user, the first network site menu being configured to transmit the received first identification data to the first network site to perform a first function of the first network site for a first account of the user corresponding to the first identification data, and the second network site menu includes a different text input field configured to receive second identification data identifying the user, the second network site menu being configured to transmit the received second identification data to the second network site to perform a second function of the second network site for a second account of the user corresponding to the second identification data.

6. The method of claim 5, wherein the first function of the first network site comprises at least one of displaying, first information from a first bill associated with the first account and processing a bill payment for the first bill.

7. The method of claim 1, wherein the image characteristics include color data, and comparing comprises comparing colors of the image and the set of images using color histograms.

8. A machine-readable hardware storage device having embedded therein a set of instructions which, when executed by a processor of a machine, causes the machine to execute operations comprising:
identifying an image depicting a physical item, the image captured on a client device;
generating an initial categorization that the physical item is in an initial category based at least in part by comparing image characteristics of the image to a set of images depicting different physical items in the initial category;
generating, based at least in part on the generated initial category, a graphical user interface (GUI) for the client device, the GUI comprising a first network site menu that is automatically selected based on the initial category, the first network site menu being configured to transmit a data item input into the first network site menu to a first network site, the first network site menu further comprising a replace network site menu option to replace the automatically selected first network site menu with a second network site menu of a second network site based on the initial categorization that was generated using image characteristics being incorrect;
receiving, from the client device that generated the image, selection of the replace network site menu option to replace the automatically selected first network site menu using a further category associated with the image; and
generating, for the client device and in response to the received selection of the replace network site menu option, a further GUI comprising the second network site menu pre-associated with the further category, the second network site menu configured to transmit a further data item input into the second network site menu to the second network site that is different from the first network site, the further data item and the data item being differently formatted data.

9. The machine-readable hardware storage device of claim 8, the operations further comprising:
receiving, from the first network site, a first set of content to include in the first network site menu; and
receiving, from the second network site menu, a second set of content to include in the second network site menu.

10. The machine-readable hardware storage device of claim 9, the operations further comprising:
causing, on the client device, display of the GUI comprising the first network site menu; and causing, on the client device, display of the further GUI comprising the second network site menu after receiving selection of the replace network site menu option.

11. The machine-readable hardware storage device of claim 10, the operations further comprising:
receiving updates to the first set of content from the first network site and receiving additional updates to the second set of content from the second network site; and
updating the first network site menu using the updates received from the first network site and updating the second network site using the additional updates received from the second network site.

12. The machine-readable hardware storage device of claim 8, wherein the first network site menu includes a text input field configured to receive the data item in a first format, and the second network site menu includes a different text input field configured to receive the further data item in a second format that is different than the first format.

13. The machine-readable hardware storage device of claim 8, wherein the image is generated by an end-user of the client device, the end-user not being an administrator of the first network site and the second network site.

14. The machine-readable hardware storage device of claim 8, wherein the image characteristics include color data, and comparing comprises comparing colors of the image and the set of images using color histograms.

15. A system comprising:
one or more processors of a machine; and
a memory storing instructions that, when executed by the one or more processors, cause the machine to perform operations comprising:
  identifying an image depicting a physical item, the image captured on a client device;
  generating an initial categorization that the physical item is in an initial category based at least in part by comparing image characteristics of the image to a set of images depicting different physical items in the initial category;
  generating, based at least in part on the generated initial category, a graphical user interface (GUI) for the client device, the GUI comprising a first network site menu that is automatically selected based on the initial category, the first network site menu being configured to transmit a data item input into the first network site menu to a first network site, the first network site menu further comprising a replace network site menu option to replace the automatically selected first network site menu with a second network site menu of a second network site based on the initial categorization that was generated using image characteristics being incorrect;
  receiving, from the client device that generated the image, selection of the replace network site menu option to replace the automatically selected first network site menu using a further category associated with the image; and
  generating, for the client device and in response to the received selection of the replace network site menu option, a further GUI comprising the second network site menu pre-associated with the further category, the second network site menu configured to transmit a further data item input into the second network site menu to the second network site that is different from the first network site, the further data item and the data item being differently formatted data.

16. The system of claim 15, the operations further comprising:
  receiving, from the first network site, a first set of content to include in the first network site menu; and
  receiving, from the second network site menu, a second set of content to include in the second network site menu.

17. The system of claim 16, the operations further comprising:
  receiving updates to the first set of content from the first network site and receiving additional updates to the second set of content from the second network site; and
  updating the first network site menu using the updates received from the first network site and updating the second network site using the additional updates received from the second network site.

18. The system of claim 15, wherein the first network site menu includes a text input field configured to receive the data item in a first format, and the second network site menu includes a different text input field configured to receive the further data item in a second format that is different than the first format.

19. The system of claim 15, wherein the image is generated by an end-user of the client device, the end-user not being an administrator of the first network site and the second network site.

20. The system of claim 15, wherein the image characteristics include color data, and comparing comprises comparing colors of the image and the set of images using color histograms.

* * * * *